US008164292B2

United States Patent
Park (10) Patent No.: US 8,164,292 B2
(45) Date of Patent: Apr. 24, 2012

(54) MOTOR CONTROLLER OF AIR CONDITIONER

(75) Inventor: Gwi Guen Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 709 days.

(21) Appl. No.: 12/292,478

(22) Filed: Nov. 19, 2008

(65) Prior Publication Data

US 2009/0140680 A1 Jun. 4, 2009

(30) Foreign Application Priority Data

Nov. 20, 2007 (KR) .................. 10-2007-0118720

(51) Int. Cl.
*H02P 23/00* (2006.01)
(52) U.S. Cl. .............. 318/438; 318/400.26; 318/400.27; 318/400.28
(58) Field of Classification Search .................. 318/438, 318/400.26, 400.27, 400.28
See application file for complete search history.

(56) References Cited

U.S. PATENT DOCUMENTS

| | | | |
|---|---|---|---|
| 5,831,842 A * | 11/1998 | Ogasawara et al. | 363/40 |
| 6,459,597 B1 * | 10/2002 | Igarashi et al. | 363/39 |
| 6,462,492 B1 * | 10/2002 | Sakamoto et al. | 318/400.32 |
| 6,636,107 B2 * | 10/2003 | Pelly | 327/552 |
| 7,606,052 B2 * | 10/2009 | Akagi | 363/40 |

* cited by examiner

*Primary Examiner* — Walter Benson
*Assistant Examiner* — David Luo
(74) *Attorney, Agent, or Firm* — McKenna Long & Aldridge LLP (57) ABSTRACT

The present invention relates to a motor controller, including a converter for converting commercial AC power into DC power, an inverter including a plurality of switching elements, the inverter receiving the DC power, converting the DC power into AC power of a specific frequency through switching operations, and supplying the AC power to a three-phase motor, and a noise filter unit connected between the commercial AC power and the converter in order to remove a high frequency current and including normal mode inductors and common mode inductor. Accordingly, the motor control can control the power factor, limit a high frequency current, and eliminate noise components, that is, ripple components of an input current.

11 Claims, 8 Drawing Sheets

MOTOR CONTROLLER OF AIR CONDITIONER

CROSS-REFERENCE TO RELATED APPLICATION

This application claims the benefit of Korean Patent Application No. 10-2007-0118720, filed on Nov. 20, 2007, which is hereby incorporated by reference in its entirety as if fully set forth herein.

BACKGROUND OF THE INVENTION

1. Technical Field

The present invention relates to a motor controller, and more specifically to a motor controller, which can control the power factor, limit a high frequency current, and eliminate noise components, that is, ripple components of an input current.

2. Background Art

A motor controller is an apparatus for converting AC power into DC power and converting the DC power into AC power again in order to drive a three-phase motor. The motor controller has been used in various fields over the length and breadth of the industry. For example, the motor controller has been used in air conditioners, including washing machines and refrigerators, elevators, vehicles, and so on.

Figure 1:
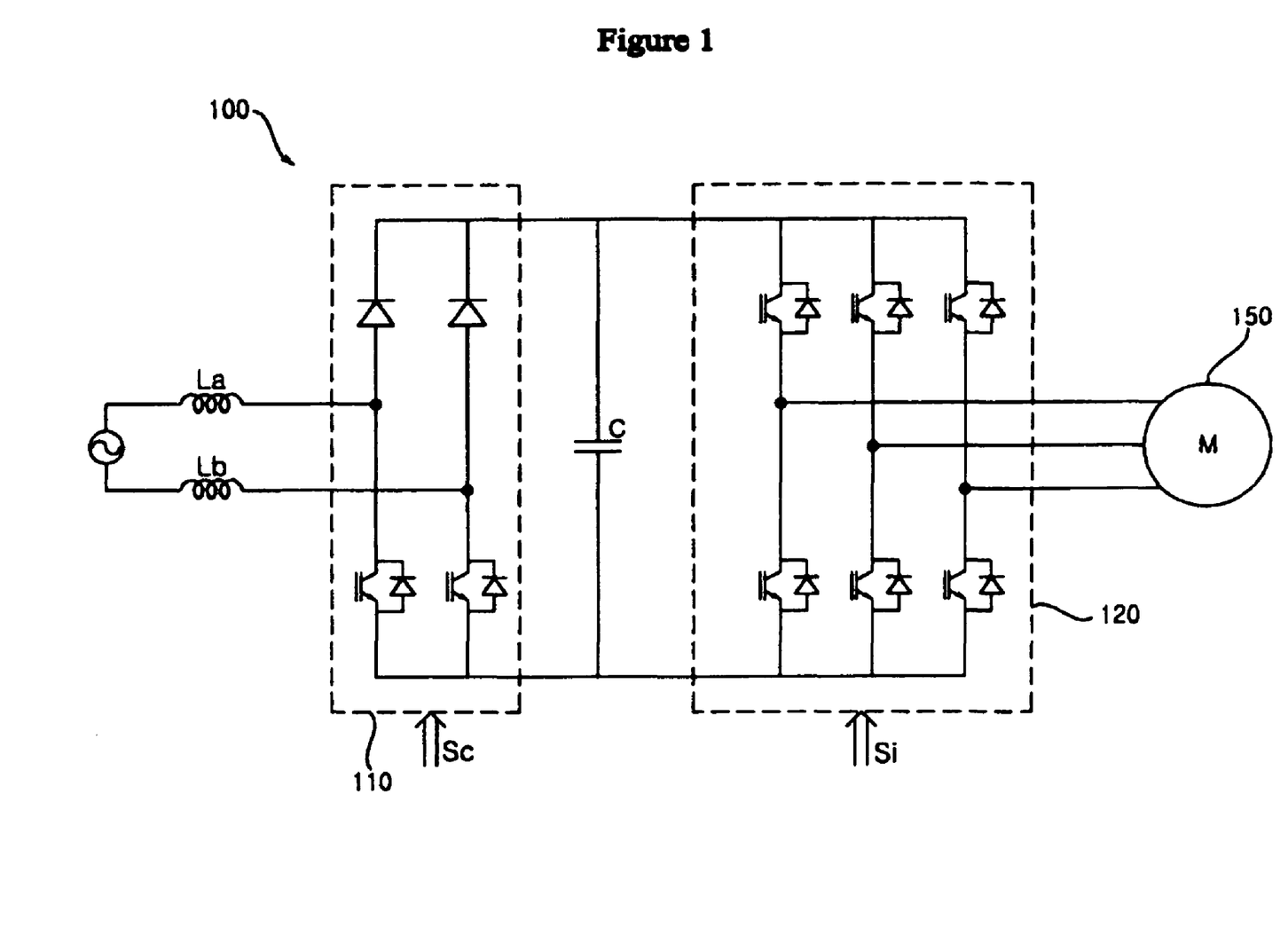
FIG. 1 is a circuit diagram showing a conventional motor controller.

FIG. 1 is a circuit diagram showing a conventional motor controller.

Referring to the drawing, a conventional motor controller 100 boosts three-phase AC power using reactors La and Lb, converts AC power into DC power using a converter 110 having switching elements, and smoothes voltage rectified by a smoothing capacitor C.

An inverter 120 includes switching elements. The inverter is supplied with smoothed DC power, and converts the DC power into three-phase AC power having a specific frequency through switching operations and applies the AC power to a three-phase motor 150.

A microcomputer (not shown) outputs a switching control signal Sc for driving the switching elements of the converter (not shown) based on voltage of the converter output terminal. Further, the microcomputer (not shown) outputs a switching control signal Si for driving the switching elements of the inverter 120 based on an output current of an inverter output terminal.

Typically, when referring to the motor controller as shown in FIG. 1, in the case in which voltage received through the reactors La and Lb from a three-phase AC power source is converted into a DC voltage, power factor control and DC voltage boosting are performed by the switching operations of the converter 110. However, since the switching elements of the converter 110 are switched at high speed, a harmonic current of a high frequency is generated. This high frequency current flows back to a system coupled to the three-phase AC power source and therefore affects other devices coupled to the system.

In the case in which the motor 150 is driven using the three-phase AC power source as described above, the operations of circuit elements within each device may become unstable by the harmonic current of a high frequency, which flows through the system or from the system to a motor driving apparatus. Accordingly, there is a possibility that reliability may be degraded.

With respect to this high frequency harmonic current, each country has prepared an additional regulation scheme. In particular, EN 6100-3-2 by the European Union (EU) has provided regulations for high-frequency harmonic current restriction regarding the current of 16 A or less and EN 6100-3-12 regarding the current of 16 A or more.

Meanwhile, the harmonic current is limited by the reactors La and Lb of FIG. 1 to some extent, but not only the harmonic current, but also noise components of an input current, etc. are not eliminated.

SUMMARY OF THE INVENTION

A feature of the present invention is to provide a motor controller, which can improve the power factor, limit the harmonic current of a high frequency occurred by high-speed switching of a converter, and eliminate noise components occurring in an input current, that is, ripple components in a motor controller employing a three-phase AC power source.

A motor controller according to an embodiment of the present invention includes a converter for converting commercial AC power into DC power, an inverter including a plurality of switching elements, the inverter receiving the DC power, converting the DC power into AC power of a specific frequency through switching operations, and supplying the AC power to a three-phase motor, and a noise filter unit connected between the commercial AC power and the converter in order to remove a high frequency current and including normal mode inductors and common mode inductor.

A motor controller in accordance with an embodiment of the present invention uses a noise filter unit including normal mode inductors and common mode inductors. Accordingly, the power factor can be improved, the harmonic current of a high frequency, occurred by high-speed switching of a converter, can be limited, and noise components occurring in an input current, that is, ripple components can be eliminated.

Further, one microcomputer is used to control a converter and an inverter and, when a motor controller operates abnormally, the converter and the inverter are controlled at the same time. Accordingly, there are advantages in that stability can be improved and the manufacturing cost can be saved.

DETAILED DESCRIPTION OF THE PREFERRED EMBODIMENTS

Hereafter, embodiments of the present invention will be described in detail with reference to the accompanying drawings.

Figure 2:
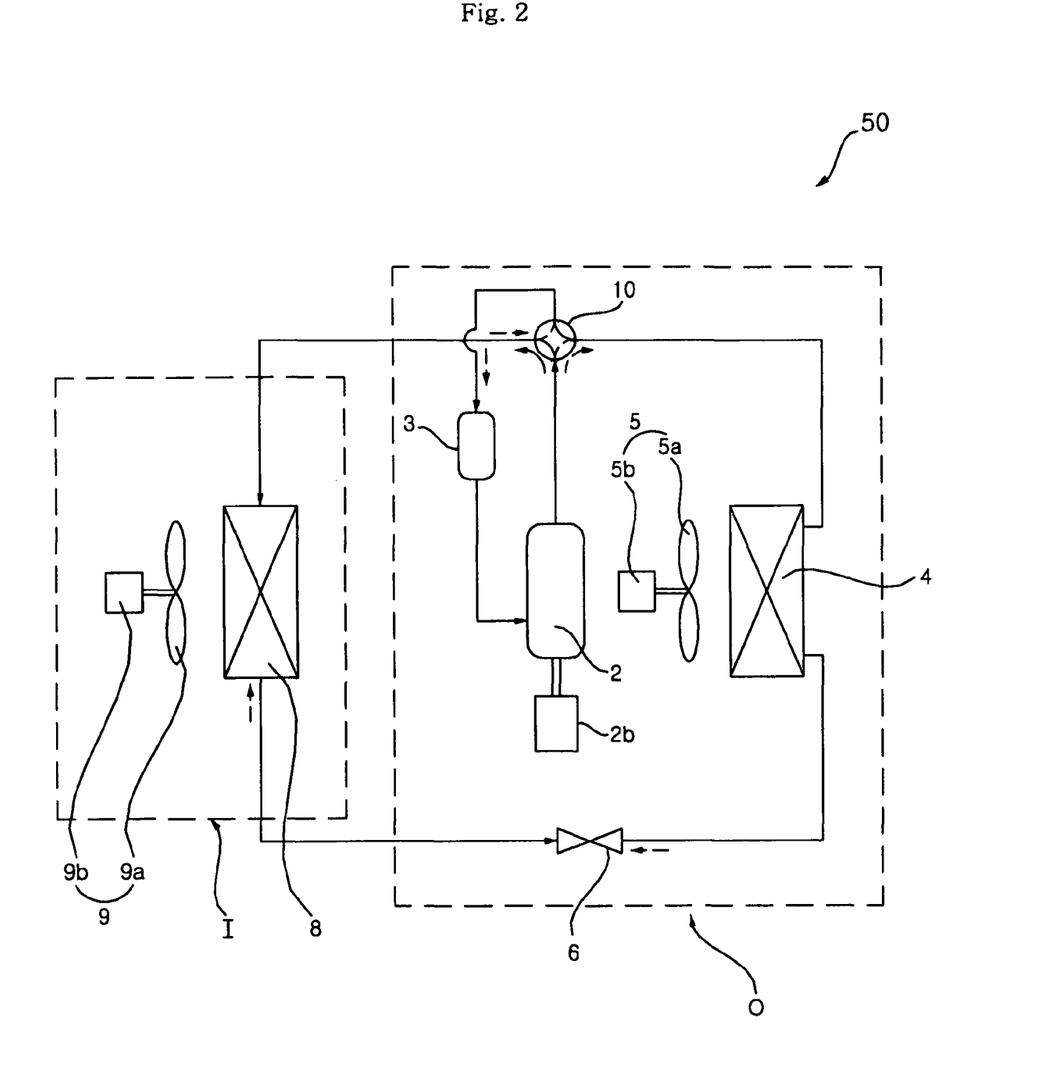
FIG. 2 is a schematic diagram of an air conditioner pertinent to the present invention.

FIG. 2 is a schematic diagram of an air conditioner pertinent to the present invention.

An air conditioner is an apparatus disposed in space, such as rooms, dining rooms, office rooms, and shops, and adapted to control temperature, moisture, cleanness, and air stream of the air in order to maintain pleasant indoor environments.

Referring to the drawing, an air conditioner 50 is largely divided into an indoor unit I and an outdoor unit O.

The outdoor unit O includes a compressor 2 functioning to compress refrigerant, a motor 2b for the compressor for driving the compressor, an outdoor-side heat exchanger 4 functioning to dissipate heat of compressed refrigerant, an outdoor ventilation fan 5, including an outdoor fan 5a disposed on one side of the outdoor heat exchanger 5 and configured to accelerate heat dissipation of refrigerant and a motor 5b for rotating the outdoor fan 5a, an expansion mechanism 6 for expanding condensed refrigerant, a cooling/heating switching valve 10 for switching the flow passage of compressed refrigerant, an accumulator 3 for temporarily storing vaporized refrigerant, removing moisture and alien substance from the refrigerant and supplying refrigerant of a specific pressure to the compressor, and so on.

The indoor unit I includes an indoor-side heat exchanger 8 disposed indoor and performing a cooling/heating function, an indoor ventilation fan 9 disposed on one side of the indoor-side heat exchanger 8 and including an indoor fan 9a for accelerating heat dissipation of refrigerant and a motor 9b for rotating the indoor fan 9a, and so on.

At least one indoor-side heat exchanger 8 can be installed. The compressor 2 can employ at least one of an inverter compressor and a constant speed compressor.

Further, the air conditioner 50 can be constructed as a cooling device for cooling the indoor or a heat pump for cooling or heating the indoor.

Meanwhile, the motor in the motor controller of the air conditioner in accordance with an embodiment of the present invention can be each of motor 2b, 5b, and 9b for operating the compressor, the outdoor fan, and the indoor fan.

Figure 3:
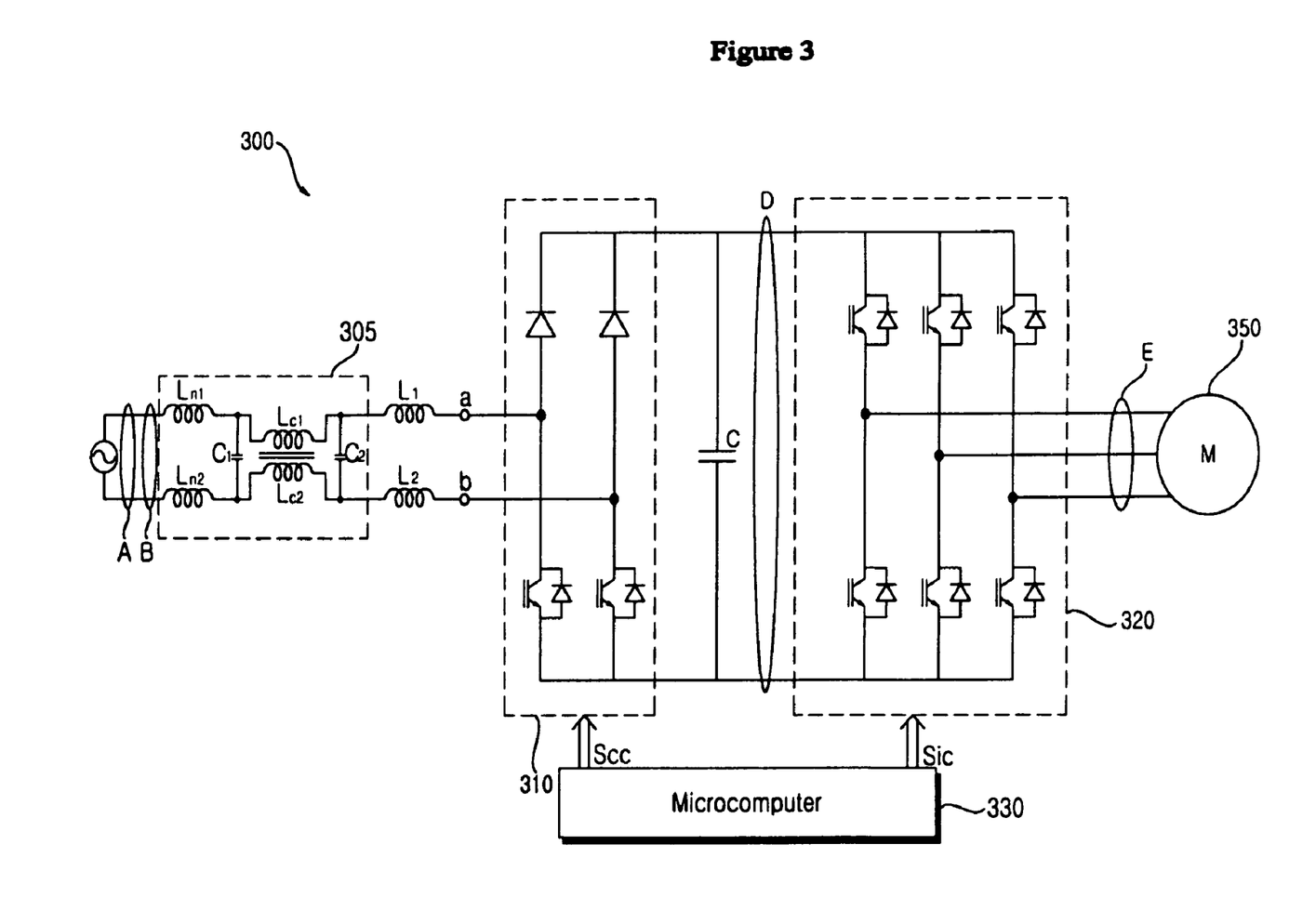
FIG. 3 is a circuit diagram showing a motor controller in accordance with an embodiment of the present invention.

FIG. 3 is a circuit diagram showing a motor controller in accordance with an embodiment of the present invention.

Referring to the drawing, a motor controller 300 in accordance with an embodiment of the present invention includes a noise filter unit 305, a converter 310, and an inverter 320. The motor controller 300 in accordance with an embodiment of the present invention can further include reactors L1 and L2, a microcomputer 330, and a smoothing capacitor C. The motor controller 300 in accordance with an embodiment of the present invention may further include input current detection means A, input voltage detection means B, dc terminal voltage detection means D, and output current detection means E.

The noise filter unit 305 is connected between a commercial AC power source and the converter 310 and includes normal mode inductors Ln1 and Ln2 and common mode inductors Lc1 and Lc2. The normal mode inductors Ln1 and Ln2 and the common mode inductors Lc1 and Lc2 can be connected to both terminals of the commercial AC power source, respectively, as shown in the drawing, but not limited thereto. For example, the normal mode inductors Ln1 and Ln2 and the common mode inductors Lc1 and Lc2 can be connected to any one of both terminals of the commercial AC power source, respectively.

Meanwhile, the normal mode inductors Ln1 and Ln2 can have inductance of 100 um or less and the common mode inductors Lc1 and Lc2 can have inductance of 1 μmH or more. High frequency components can be limited by the normal mode inductors Ln1 and Ln2 and low frequency components can be limited by the common mode inductors Lc1 and Lc2. Thus, the filter function of a specific band is possible and noise components of an input current, that is, ripple components can be eliminated. A high frequency current occurring by high-speed switching of the converter 310 can also be limited.

Meanwhile, the noise filter unit 305 can further include a first capacitor C1 connected in parallel between the normal mode inductors Ln1 and Ln2 and the common mode inductors Lc1 and Lc2, and a second capacitor C2 connected between the common mode inductors Lc1 and Lc2 and the converter 310, that is, connected to the common mode inductors Lc1 and Lc2. Accordingly, the noise filter unit 305 is a LC filter and can perform the filter function of a specific band and also eliminate noise components, that is, ripple components of an input current. A high frequency current can also be limited.

Another example of the noise filter unit 305 is described later on with reference to FIG. 5.

The converter 310 converts commercial AC power, received through the noise filter unit 305, into DC power. The converter 310 can be implemented in various ways. However, when the commercial AC power source is a single-phase AC power source, a half-bridge type converter using four diodes and two switching elements is shown in the drawings as an example of the converter.

The converter 310 performs a switching operation in response to a switching control signal Scc from the microcomputer 330. Accordingly, the power factor is controlled and AC power is converted into DC power and then output.

The smoothing capacitor C is coupled to an output terminal of the converter 310. The smoothing capacitor C smoothes the DC power output from the converter 310. Hereinafter, the output terminal of the converter 310 is referred to as a dc terminal or a dc link terminal. the DC voltage smoothed at the dc terminal is applied to the inverter 320.

The inverter 320 includes a plurality of inverter switching elements. The inverter 320 converts the smoothed DC power into three-phase AC power of a specific frequency through on/off operations of the switching elements and outputs the three-phase AC power. More specifically, an upper arm switching element and a lower arm switching element, which are connected in series, form one pair, and a total of three pairs of the upper and lower arm switching elements are connected in parallel. The diodes are connected to the switching elements, respectively, in an anti-parallel manner. When a switching control signal Sic from the microcomputer 330 is applied to a gate terminal of each of the switching elements, each switching element performs the switching operation. Accordingly, three-phase AC power having a specific frequency is output.

The three-phase AC power output from the inverter 320 is applied to each phase of the three-phase motor 350. Here, the three-phase motor 350 is equipped with a stator and a rotor. AC power of a specific frequency of each phase is applied to the coils of the stator of each phase, so that the rotor is rotated. The types of the three-phase motor 350 can be various, such as a BLDC motor, a synRM motor, etc. Meanwhile, when classifying the three-phase motor 350 in terms of its function, it may be the motor 2b for the compressor used in the compressor of the air conditioner, and the motor 5b, 9b for the fan for driving the fan.

The reactors L1 and L2 are connected between the noise filter unit 305 and the converter 310, and boosts commercial AC power and supplies boosted AC power to the converter 310. More specifically, the AC power is stored in the reactors L1 and L2 by the on/off operations of the plurality of the converter switches included within the converter 310 and then supplied to the converter 310, so the boosting operation is performed. Meanwhile, the reactors L1 and L2 are used together with the noise filter 305, and function to correct the power factor of AC power, limit a high frequency current between the commercial AC power source and the converter 310, and eliminate noise components of an input current.

The microcomputer 330 controls the converter 310 and the inverter 320 at the same time.

The microcomputer 330 outputs the switching control signal Scc for the converter to the converter 310 in order to control the switching operation of the converter 310. The switching control signal Scc is a switching control signal for PWM, and is generated based on a detected dc terminal voltage and output to the converter 310.

The microcomputer 330 outputs the switching control signal Sic for the inverter to the inverter 320 in order to control the switching operation of the inverter 320. The switching control signal Sic is a switching control signal for PWM, and is generated based on a detected output current and output to the inverter 330.

The microcomputer 330 performs control to protect circuit element when the motor controller 300 operates abnormally. For example, when the converter 310 operates abnormally, the microcomputer 330 performs control to stop the converter 310 and the inverter 320 at the same time. Since a single microcomputer 330 to commonly control the converter 310 and the inverter 320 is used, the manufacturing cost can be saved, and a protection operation can be performed rapidly when circuit elements operate abnormally. Further, switching frequencies of the converter 310 and the inverter 320 can be made identical.

The input current detection means A detects an input current ii from the commercial AC power. The input current detection means A may be disposed anywhere between the commercial AC power source and the converter 310, but it is shown in the drawing that the input current detection means A is placed between the commercial AC power source and the noise filter unit 305. For input current detection, a current sensor, a current transformer (CT), a shunt resistor or the like can be used. The detected input current ii is applied to the microcomputer 330, and it is used to generate the converter switching control signal and used in a protection operation.

The input voltage detection means B detects an input voltage vi from the commercial AC power. The input voltage detection means B may be disposed anywhere between the commercial AC power source and the converter 310, but it is shown in the drawing that the input voltage detection means B is placed between the commercial AC power source and the noise filter unit 305. For input voltage detection, a resistor element or the like can be used. The detected input voltage vi is applied to the microcomputer 330, and it is used to generate the converter switching control signal and used in a protection operation.

The dc terminal detection means D detects a voltage Vdc at the dc terminal, that is, the output terminal of the converter. As the dc terminal voltage detection means D, a resistor element or the like may be used across the dc terminal. The detected dc terminal voltage Vdc is applied to the microcomputer 330, and it is used to generate the converter switching control signal and used in a protection operation.

The output current detection means E detects an output current io of an inverter output terminal, that is, a current applied to the motor 350. The output current detection means E may be disposed between the inverter 320 and the motor 350 and may employ a current sensor, a CT, a shunt resistor or the like for current detection. Further, the output current detection means E may be a current sensor disposed within the motor 350. Further, the output current detection means E may be a shunt resistor having one terminal connected to the three lower arm switching elements of the inverter. The detected output current io is applied to the microcomputer 330, and it is used to generate the inverter switching control signal and used in a protection operation.

Figure 4:
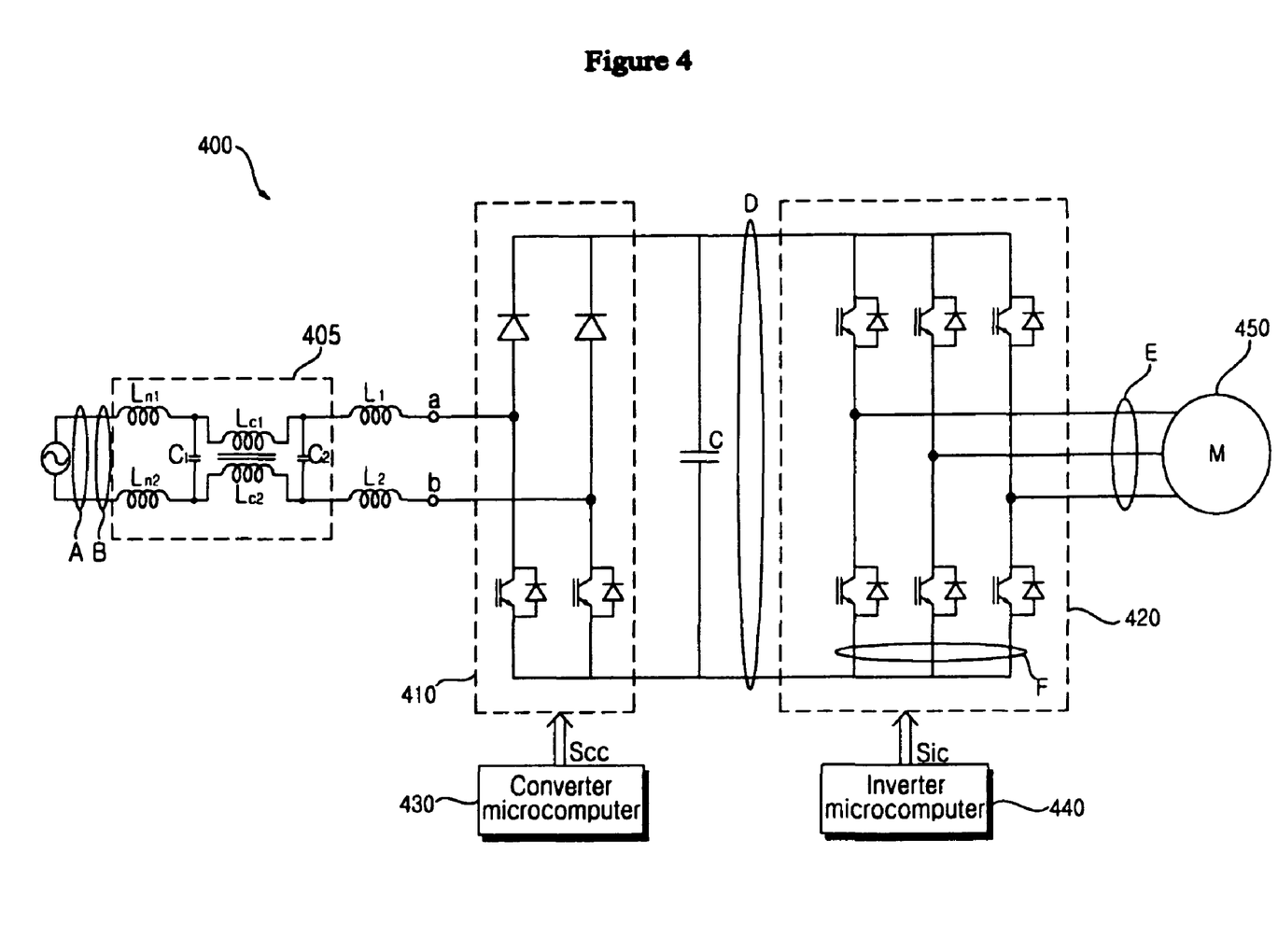
FIG. 4 is a circuit diagram showing a motor controller in accordance with an embodiment of the present invention.

FIG. 4 is a circuit diagram showing a motor controller in accordance with an embodiment of the present invention.

Referring to the drawing, a motor controller 400 of FIG. 4 is almost similar to the motor controller of FIG. 3. That is, a noise filter unit 405, a converter 410, an inverter 420, reactors L1 and L2, a smoothing capacitor C, input current detection means A, input voltage detection means B, dc terminal voltage detection means D, and output current detection means E are identical to those of FIG. 3.

However, the common microcomputer 330 to control the converter 310 and the inverter 320 at the same time is used in FIG. 3, but a converter microcomputer 430 for controlling the converter 410 and an inverter microcomputer 440 for controlling the inverter 420 are separated and shown in FIG. 4.

A detected input current ii, a detected input voltage vi, and a dc terminal voltage Vdc are applied to the converter microcomputer 430, and they are used to generate a converter switching control signal and used in a protection operation. Further, a detected output current io is applied to the inverter microcomputer 440, and it is used to generate an inverter switching control signal and used in a protection operation.

Detailed description of the converter microcomputer 430 and the inverter microcomputer 440 will be described later on with reference to FIGS. 6 and 7, respectively.

Figure 5:
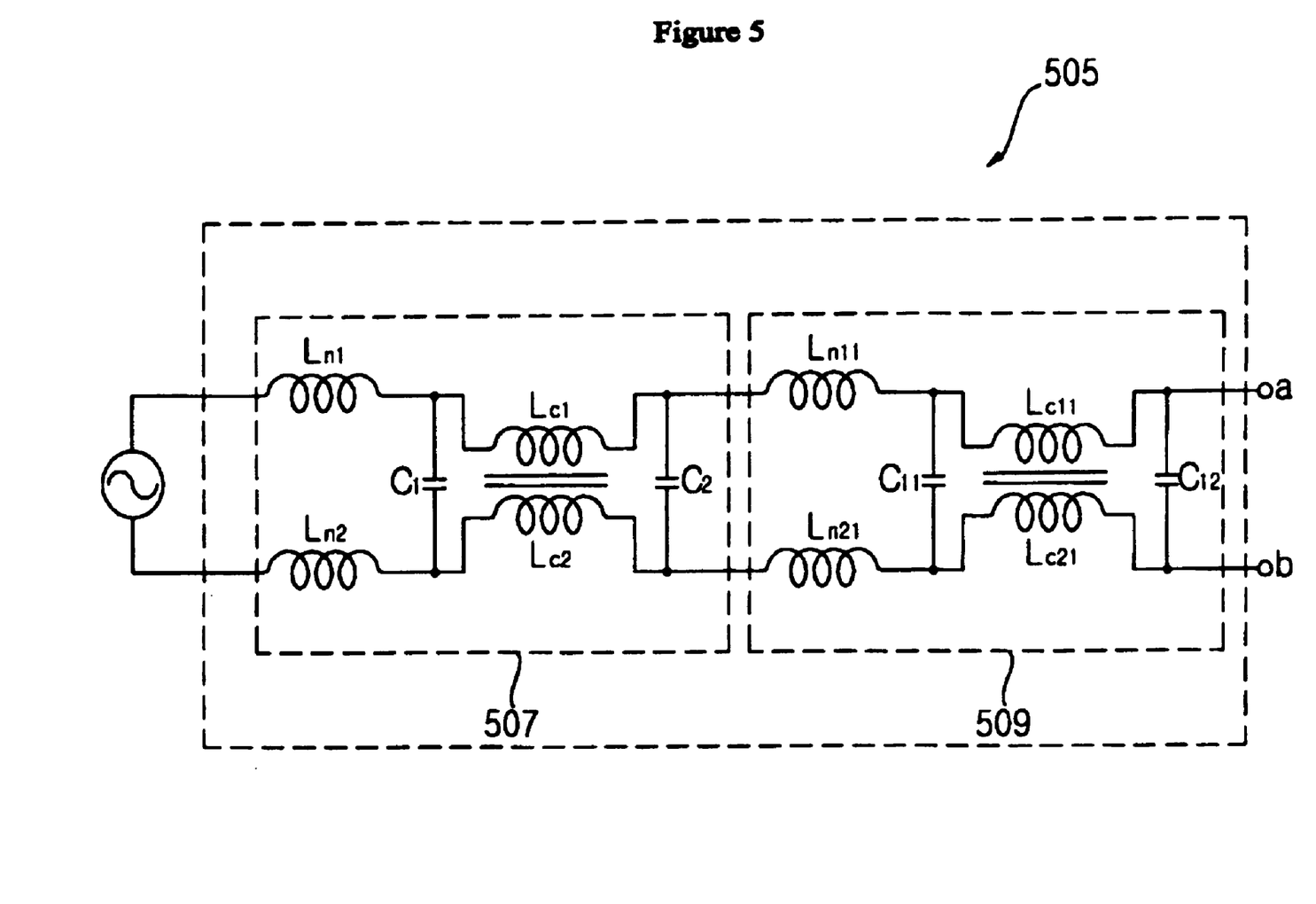
FIG. 5 is a circuit diagram showing another example of a noise filter unit of FIGS. 3 and 4.

FIG. 5 is a circuit diagram showing another example of the noise filter unit 305, 405 of FIGS. 3 and 4.

Referring to the drawing, a noise filter unit 505 of FIG. 5 shows only both ends a-b of the noise filter unit 305, 405 of FIGS. 3 and 4. The noise filter unit 505 of FIG. 5 is similar to the noise filter unit 305,405 of FIGS. 3 and 4, but differs from the noise filter unit 305, 405 in that the same constituent elements are repeatedly arranged.

In other words, the noise filter unit 505 includes a plurality of filter units comprising normal mode inductors, a first capacitor, common mode inductors, and a second capacitor. The filter units are connected consecutively, that is, in a cascade manner.

As shown in the drawing, a first filter unit 507, comprising normal mode inductors Ln1 and Ln2, a first capacitor C1, common mode inductors Lc1 and LC2, and a second capacitor C2, and a second filter unit 509, comprising normal mode inductors Ln11 and Ln21, a first capacitor C11, common mode inductors Lc11 and Lc21, and a second capacitor C21, are connected in a cascade manner.

According to this configuration, the performance of the noise filter is further improved and, therefore, the performance of the limit of noise components of an input current and the limit of a high frequency current can be improved.

Figure 6:
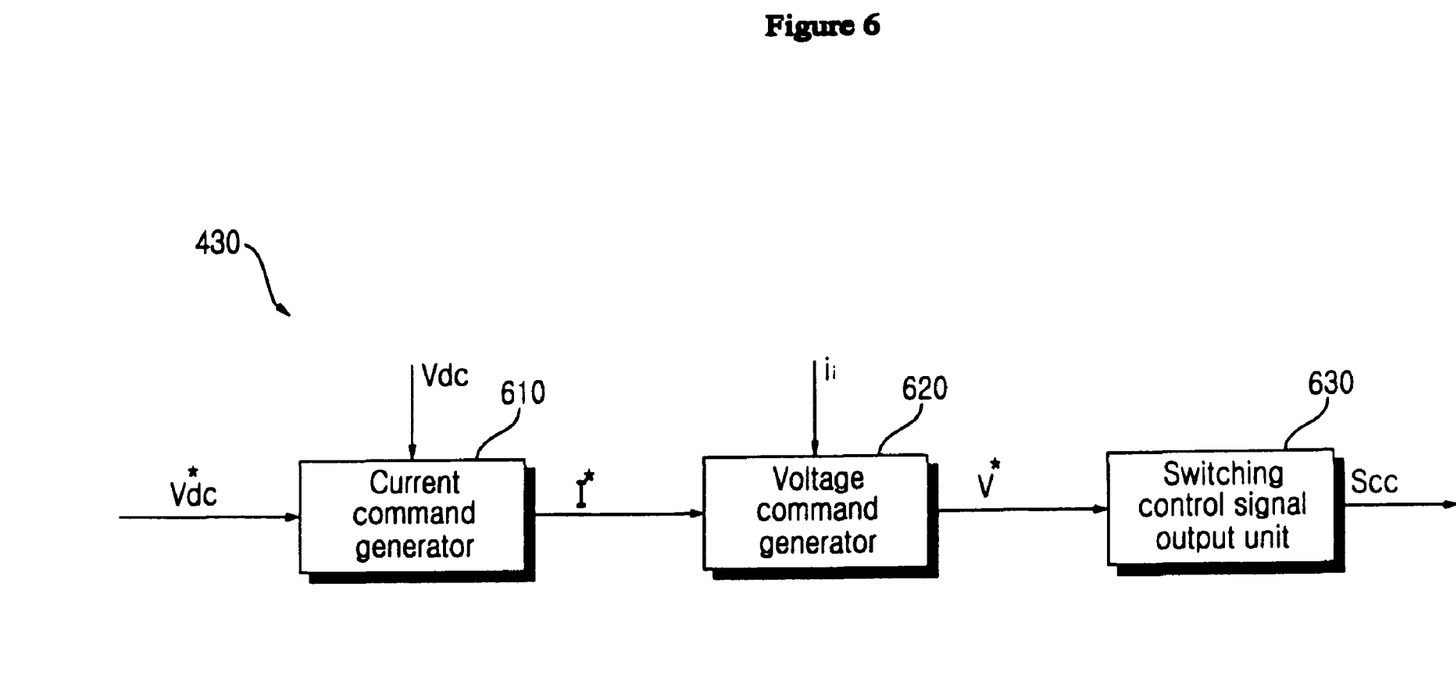
FIG. 6 is a schematic block diagram showing the inside of a converter microcomputer of FIG. 4.

FIG. 6 is a schematic block diagram showing the inside of the converter microcomputer of FIG. 4.

The converter microcomputer 430 includes a current command generator 610, a voltage command generator 620, and a switching control signal output unit 630.

The current command generator 610 generates a current command values I* based on a detected dc terminal voltage Vdc and a detected dc voltage command value V*dc. That is, the current command generator 610 can include a PI controller (not shown) for generating the current command values I* based on a detected dc terminal voltage Vdc and a detected dc voltage command value V*dc, and a current command limit unit (not shown) for limiting the level of the current command value I* not to exceed a specific value. Meanwhile, in this case, the current command value I* may be the amount of a current command.

The voltage command generator 620 generates a voltage command value V* based on the current command value I* and a detected input current ii. That is, the voltage command generator 620 can include a PI controller (not shown) for generating the voltage command value V* based on the current command value I* and the detected input current ii, and a voltage command limit unit (not shown) for limiting the level of the voltage command value V* not to exceed a specific value.

The switching control signal output unit 630 generates the switching control signal Scc for the converter, that is, a PWM signal based on the voltage command value V* and outputs the generated signal to the converter.

Figure 7:
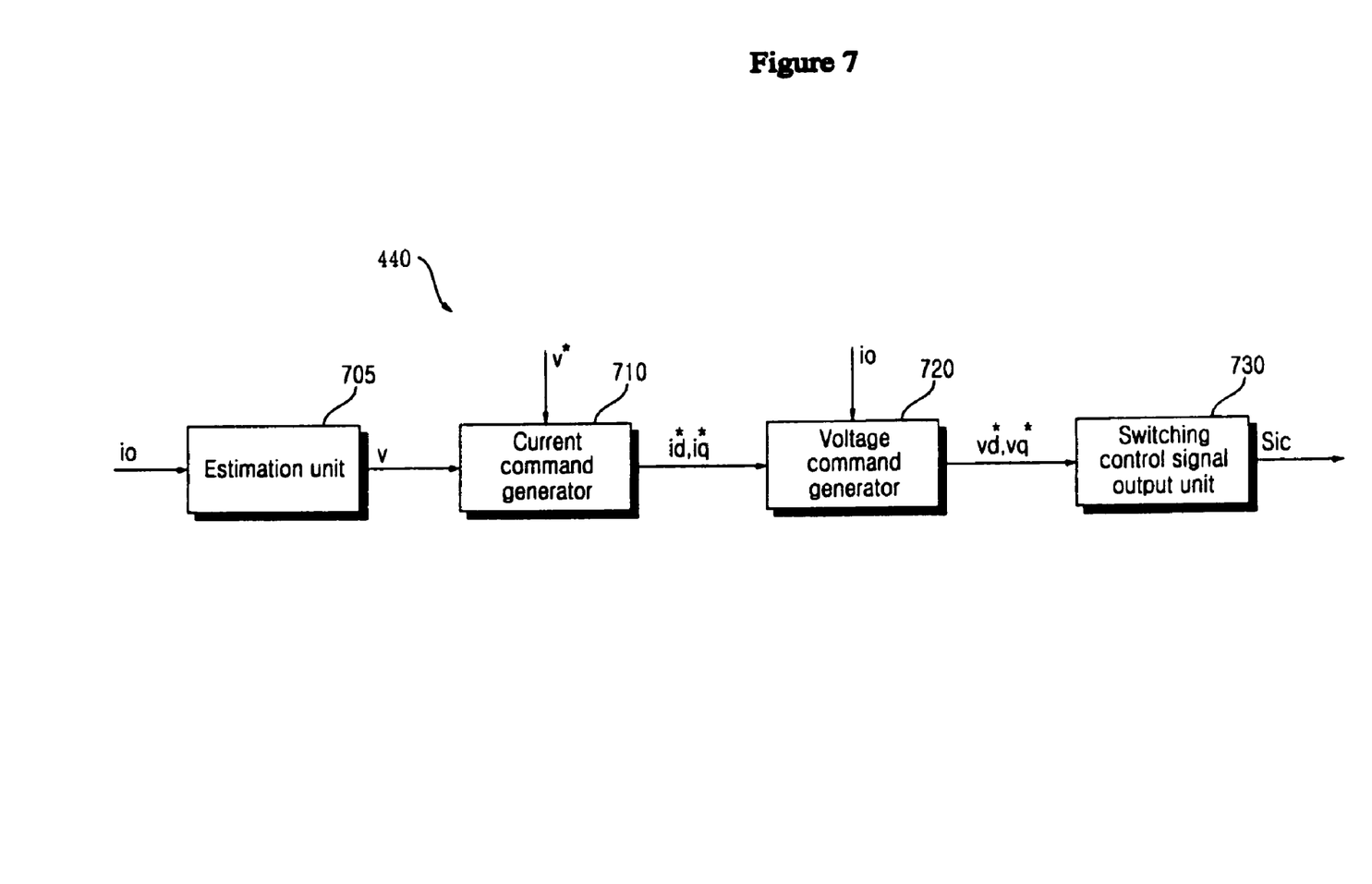
FIG. 7 is a schematic block diagram showing the inside of an inverter microcomputer of FIG. 4.

FIG. 7 is a schematic block diagram showing the inside of the inverter microcomputer of FIG. 4.

The inverter microcomputer 440 includes an estimation unit 705, a current command generator 710, a voltage command generator 720, and a switching control signal output unit 730.

The estimation unit 705 estimates a rotor velocity v of the motor based on a detected output current io. The estimation unit 705 can also estimate the position of the rotor in addition to the velocity of the rotor.

The current command generator 710 generates current command values i*d, i*q based on the estimated velocity v and a velocity command value v*. That is, the current command generator 710 can include a PI controller (not shown) for generating the current command values i*d, i*q based on the estimated velocity v and the velocity command value v* and a current command limit unit (not shown) for limiting the level of each of the current command values i*d, i*q not to exceed a specific value.

The voltage command generator 720 generates voltage command values v*d, v*q based on the current command values i*d, i*q and a detected current io. That is, the voltage command generator 720 can include a PI controller (not shown) for generating the voltage command values v*d, v*q based on the current command values i*d, i*q and the detected current io, and a voltage command limit unit (not shown) for limiting the level of each of the voltage command values v*d, v*q not to exceed a specific value.

The switching control signal output unit 730 generates the switching control signal Sic for the inverter, that is, a PWM signal based on the voltage command values v*d, v*q and outputs the generated signal to the inverter.

Meanwhile, the microcomputer 330 of FIG. 3 can include all the constituent elements 610, 620, and 630 of the converter microcomputer 430 shown in FIG. 6 and all the constituent elements 705, 710, 720, and 730 of the inverter microcomputer 440 shown in FIG. 7.

FIG. 8 is a timing diagram showing input currents in the respective motor controller of FIGS. 1 and 3.

Figure 8A:
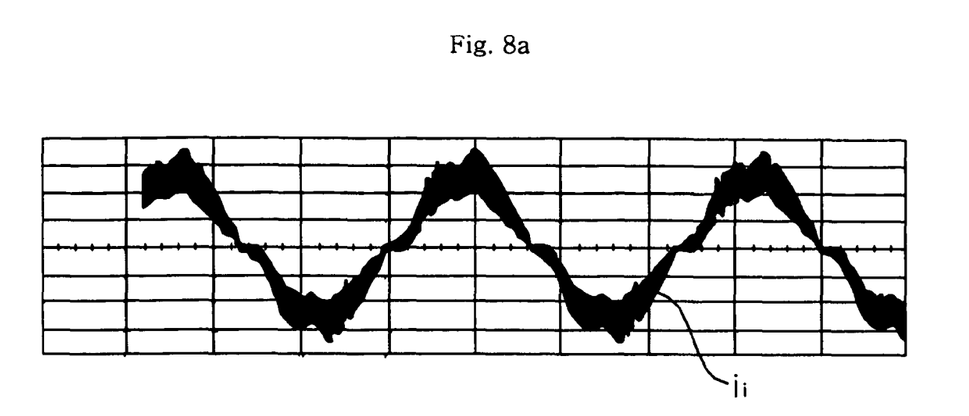
FIG. 8 is a timing diagram showing input currents in respective motor controller of FIGS. 1 and 3.

FIG. 8A is a timing diagram of the input current of FIG. 1. From the drawing, it can be seen that there are lots of noise components, that is, ripple components at the input current ii of FIG. 1. According to the motor controller 100 of FIG. 1, there is a possibility that circuit elements can be damaged due to noise components, a high frequency component, etc., so that the stability of the motor controller becomes low.

Figure 8B:
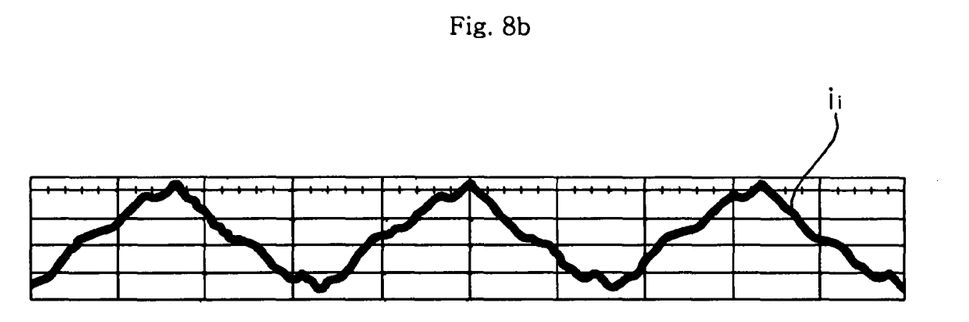

FIG. 8B is a timing diagram of the input current of FIGS. 3 and 4. The motor controller 300,400 of FIGS. 3 and 4 is a motor controller using the noise filter unit 405,405 including the normal mode inductors and the common mode inductors, and has limited noise components, a high frequency current, etc. by the noise filter unit 405,405. From the drawing, it can be seen that noise components of the input current ii, that is, ripple components are reduced significantly.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

The motor control according to the present invention can be employed in a motor controller, which can control the power factor, limit a high frequency current, and eliminate noise components, that is, ripple components of an input current.

What is claimed is:

1. A motor controller, comprising:
a converter adapted to convert AC power, obtained from an AC power source, into DC power;
an inverter, including a plurality of switching elements, the inverter receiving the DC power, converting the DC power into AC power of a specific frequency through switching operations, and supplying the AC power to a three-phase motor; and
a noise filter unit connected between the AC power source and the converter in order to remove a high frequency current and including normal mode inductors and common mode inductors, and
wherein the noise filter unit further comprises:
a first capacitor connected between the normal mode inductors and the common mode inductors; and
a second capacitor connected between the common mode inductors and the converter.

2. The motor controller of claim 1, wherein:
the noise filter unit comprises one or more filter units including the normal mode inductors, a first capacitor, the common mode inductors, and a second capacitor, and
the filter units are connected consecutively.

3. The motor controller of claim 1, further comprising reactors connected between the noise filter unit and the converter.

4. The motor controller of claim 1, further comprising a microcomputer that commonly controls the converter and the inverter.

5. The motor controller of claim 1, further comprising:
a converter microcomputer for controlling a switching operation of the converter; and
an inverter microcomputer for controlling a switching operation of the inverter.

6. The motor controller of claim 5, wherein the converter microcomputer comprises:
a current command generator adapted to generate a current command value based on:
a voltage of a DC link terminal, wherein the DC link terminal is an output terminal of the converter, and
a command value of the DC link terminal voltage;
a voltage command generator adapted to generate a voltage command value based on:
the current command value, and
an input current from the AC power; and
a switching control signal output unit adapted to output a switching control signal to drive the switching elements of the converter.

7. The motor controller of claim 5, wherein the inverter microcomputer comprises:
an estimation unit adapted to estimate a velocity of the motor based on an output current detected from an output terminal of the inverter;

a current command generator adapted to generate d,q-axis current command values based on the estimated velocity and a velocity command value;

a voltage command generator adapted to generate d,q-axis voltage command values based on the current command values and the detected output current; and a switching control signal output unit adapted to output a switching control signal to drive the switching elements of the inverter.

8. The motor controller of claim 1, further comprising input current detection means for detecting an input current input from the AC power source.

9. The motor controller of claim 1, further comprising input voltage detection means for detecting an input voltage input from the AC power source.

10. The motor controller of claim 1, further comprising DC terminal voltage detection means for detecting a DC terminal current, wherein the DC terminal is an output terminal of the converter.

11. The motor controller of claim 1, further comprising output current detection means for detecting an output current, wherein the output is an output terminal of the inverter.

* * * * *